United States Patent [19]

Au

[11] Patent Number: 5,548,795
[45] Date of Patent: Aug. 20, 1996

[54] METHOD FOR DETERMINING COMMAND EXECUTION DEPENDENCIES WITHIN COMMAND QUEUE REORDERING PROCESS

[75] Inventor: Wing Y. Au, Sunnyvale, Calif.

[73] Assignee: Quantum Corporation, Milpitas, Calif.

[21] Appl. No.: 218,567

[22] Filed: Mar. 28, 1994

[51] Int. Cl.$^6$ .................................................. G06F 12/02
[52] U.S. Cl. .......................... 395/872; 395/404; 395/823; 364/DIG. 1; 364/236.2; 364/239.7
[58] Field of Search ........................... 364/200 MS File, 364/900 MS File; 369/18; 360/55, 86, 97.01, 135, 55; 395/404, 439–441, 823, 872

[56] References Cited

U.S. PATENT DOCUMENTS

| | | | |
|---|---|---|---|
| 3,623,006 | 11/1971 | Balakian | 395/438 |
| 3,629,860 | 12/1971 | Capozzi | 395/404 |
| 3,990,055 | 11/1976 | Henderson et al. | 395/860 |
| 4,232,365 | 11/1980 | Englund | 395/404 |
| 4,434,487 | 2/1984 | Rubinson et al. | 371/10.2 |
| 4,583,166 | 4/1986 | Hartung et al. | 395/440 |
| 5,140,683 | 8/1992 | Gallo et al. | 395/444 |
| 5,184,341 | 2/1993 | Hamasaka et al. | 369/54 |
| 5,241,546 | 8/1993 | Peterson et al. | 371/37.1 |
| 5,255,136 | 10/1993 | Machado et al. | 360/77.02 |
| 5,341,351 | 8/1994 | Ng | 369/30 |
| 5,422,762 | 6/1995 | Jerbic | 360/48 |
| 5,483,641 | 1/1996 | Jones et al. | 395/823 |

OTHER PUBLICATIONS

Spencer W. Ng, Improving Disk Performance Via Latency Reduction, IEEE Transactions on Computers, vol. 40, No. 1, pp. 22–30, Jan. 1991.

Charles J. Sippl, Microcomputer Dictionary and Guide, p. 318, 1975.

E. M. McGraw, Priority Circuit for Servicing Requests Queued by Sector, IBM Technical Disclosure Bulletin, vol. 12, No. 6, Nov. 1969, pp. 815–819.

Margo Seltzer, Disk Scheduling Revisited, USENIX–Winter 1990, pp. 313–324.

Denning, "Effects of Scheduling on File Memory",*AFIPS Joint Compuer Conference Proc.* vol. 30, 1967, pp. 9–21.

Gibson, *Redundant Disk Arrays—Reliable, Parallel Secondary Storage*, MIT Press, Cambridge MA, ©1992, pp. 17–20: "Lowering I/O Response Time".

Geist & Daniel, "A Continuum of Disk Scheduling Algorithms", *ACM Trans. Computer Systems*, vol. 5, No. 1, Feb. 1987, pp. 77–92.

Teory & Pinkerton, "A Comparative Analysis of Disk Scheduling Policies", *Comm. of the ACM*, vol. 15, No. 3, Mar. 1972, pp. 177–184.

*Primary Examiner*—Matthew M. Kim
*Attorney, Agent, or Firm*—David B. Harrison

[57] ABSTRACT

A disk drive command queue reordering method includes calculation of least-latency and accounts for dependencies of I/O commands in the queue to avoid data hazards with respect to reordering of I/O commands. Command queue representation is augmented by a graph structure representing dependencies of queue commands. Computational overhead associated with constructing, maintaining, and executing graph flow analysis relative to the dependency graph is sufficiently low to allow interleaved operation with higher level disk drive functions such as timely interaction with the host device. The disclosure includes a method of calculating and maintaining the dependency information in a command queue and using this information to constrain command reordering in a time and computationally efficient manner.

11 Claims, 7 Drawing Sheets

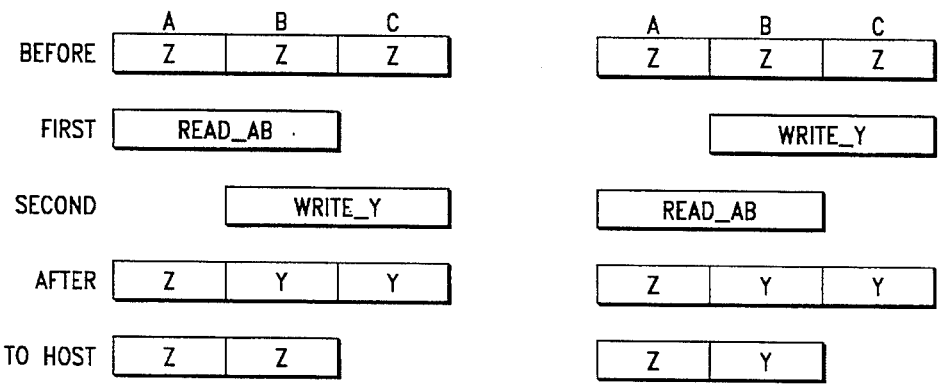
*FIG.—1B*
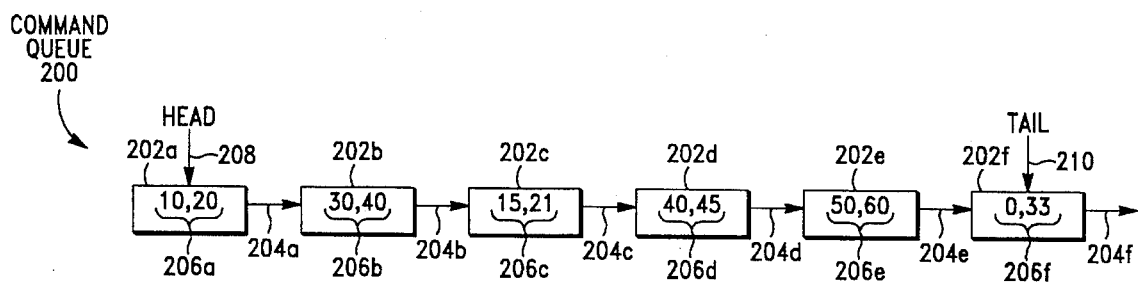
*FIG.—2*
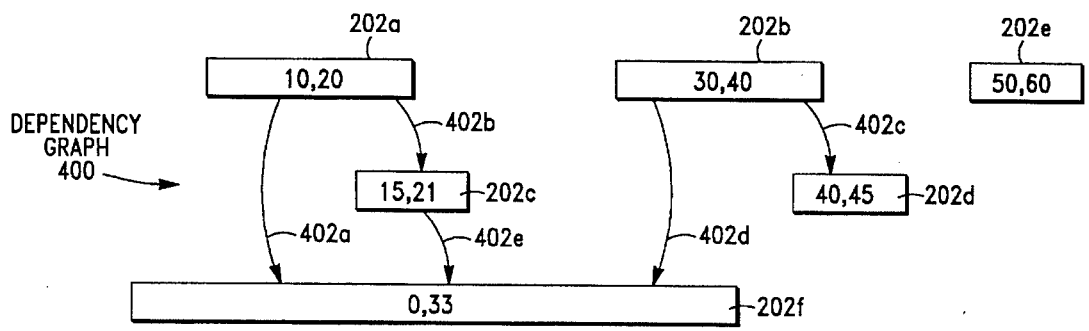
*FIG.—4*
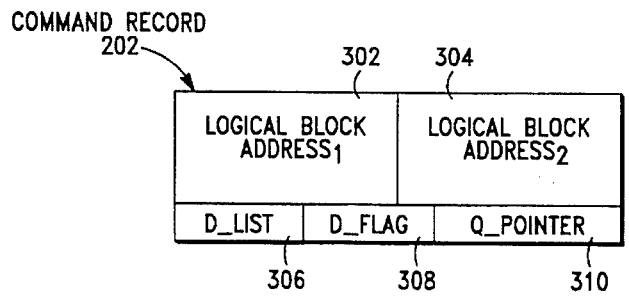
*FIG.—3*

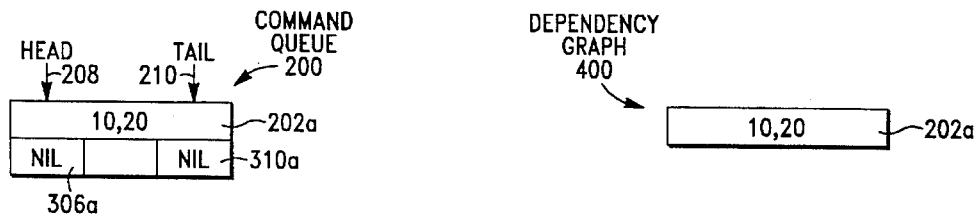
*FIG.−5A*    *FIG.−6A*
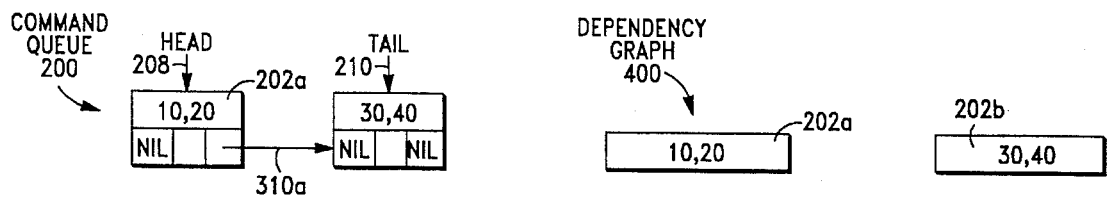
*FIG.−5B*    *FIG.−6B*
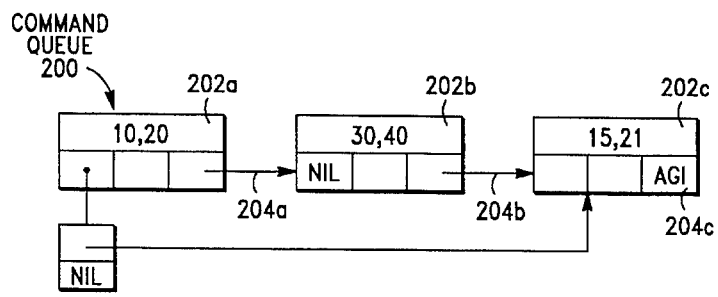
*FIG.−5C*
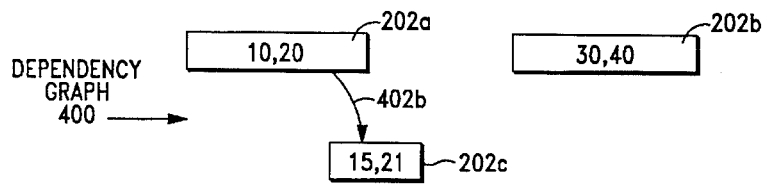
*FIG.−6C*

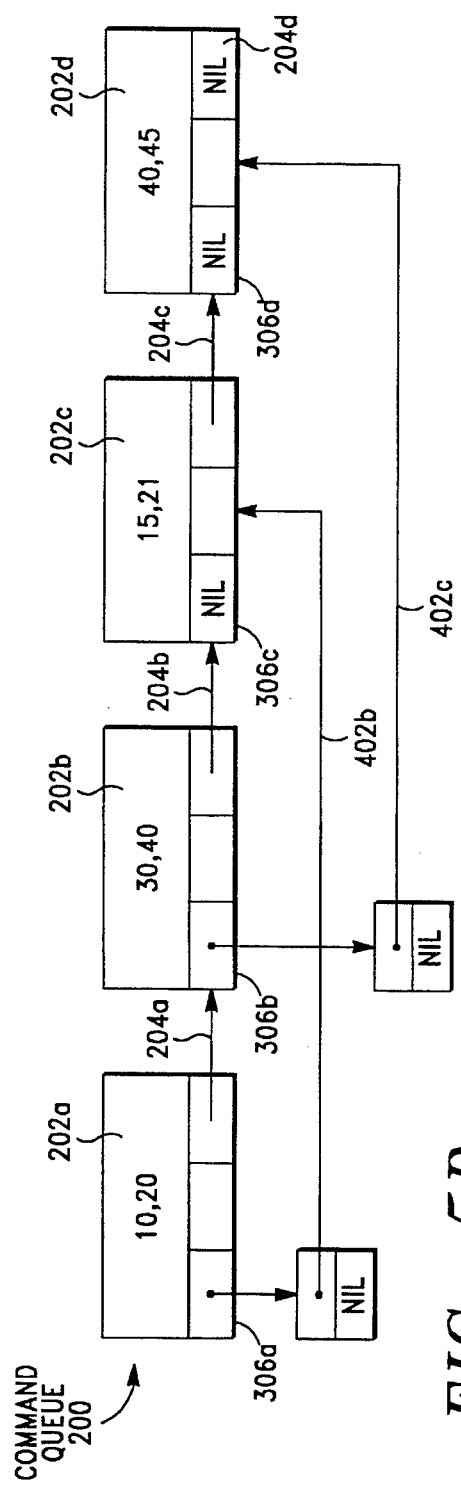
FIG.−5D
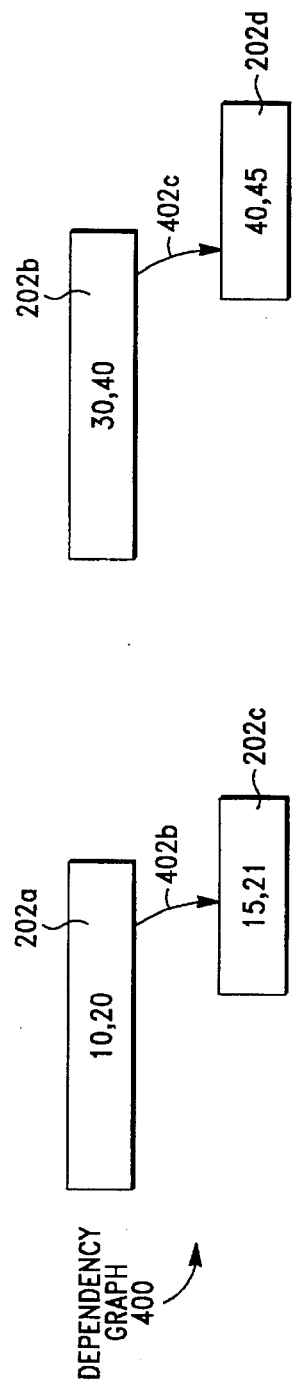
FIG.−6D

METHOD FOR DETERMINING COMMAND EXECUTION DEPENDENCIES WITHIN COMMAND QUEUE REORDERING PROCESS

FIELD OF THE INVENTION

The present invention relates to the queuing and reordering of commands received by a disk drive from a host. More specifically, the present invention relates to handling commands with overlapping address ranges when reordering commands in a queue.

BACKGROUND OF THE INVENTION

A disk drive receives multiple commands to execute essentially random disk address input/output (I/O) transfers. In other words, the I/O commands require data to be written or read at various locations throughout the disk drive. When the commands arrive faster than they can be executed, they accumulate in a queue. By recognizing that I/O commands need not be executed in the order received, I/O throughput may be increased by minimizing latency between transfers, i.e., minimize the interval between times of actually reading or writing data relative to the disk media. Execution of commands in an order different from that received is called a command queue reordering procedure.

Various methods have been used before in reordering a command queue. One method termed "Shortest Seek Time First," or SSTF, reorders the commands in the queue so that the command which has the shortest seek time with respect to the command being executed is next executed. Another method called the sequential cylinder access number (SCAN) method reorders the commands in the queue such that they are processed in cylinder number order, ensuring that I/O transfers near the edges of the disk are processed. These and other queuing methods based on the cylinder number of the I/O transfers are described and analyzed in Teorey and Pinkerton, "A comparative Analysis of Disk Scheduling Policies," *Comm. ACM*, Vol. 15, No. 3, March 1972, pp. 177–184, in Geist and Daniel, "A continuum of Disk Scheduling Algorithms," *ACM Trans. on Computer Systems*, Vol. 5, No. 1, February, 1987, pp. 77–92, and in Denning, "Effects of Scheduling on File Memory Operations," *American Federation of Information Processing Societies (AFIPS) Joint Computer Conference Proceedings*, Vol. 30, 1967, pp. 9–21.

U.S. Pat. No. 4,583,166, U.S. Pat. No. 5,140,683, and U.S. Pat. No. 4,232,365 also describe various queue reordering techniques.

Co-pending application Ser. No. 08/149,982 filed on Nov. 10, 1993, by the present inventor and entitled: ROTATIONAL LATENCY QUEUE REORDERING, and assigned in common to the assignee of the present application, describes a queue reordering technique taking into account both seek time and rotational latency in determining the time delay between executing commands. In the queue reordering process, a simple, step wise, shortest time first algorithm promotes a selected command to next execute. First, the algorithm initializes variables for the current pass of reordering. Second, a series of latency computation steps for each command in the queue provides a measure of latency for each command with respect to the head-of-queue command, i.e., the command presently under execution. Third, a scan along the command queue selects the least-latency command and promotes such command to a position immediately following the head-of-queue command, i.e., following the command currently under execution. The above first, second, and third procedures are completed during execution of the head-of-queue command. At completion, the head-of-queue command is deleted from the command queue, thereby making the just promoted least-latency command next to execute. Upon initiation of such execution, the algorithm repeats for another pass of the above noted step procedures for command queue reordering.

Thus, a variety of algorithms exist for scheduling I/O commands in a command queue. For expository convenience, the present application will refer to the command queue reordering algorithm of U.S. patent application Ser. No. 08/149,982, but need not be limited to such context of use. Accordingly, the disclosure of my co-pending of U.S. patent application Ser. No. 08/149,982 is incorporated herein fully by reference thereto.

Any queue reordering scheme must address data hazards in handling I/O commands with overlapping ranges of logical block addresses. For example, consider two I/O commands sent to the disk drive and having overlapping ranges of logical block addresses (LBA). If either command is a write command, the order of execution of the two commands can affect data written to the disk or transferred to the host. This condition is termed a "data hazard." Data hazards include a write-write hazard and a read-write hazard. If both commands, even with overlapping ranges of logical addresses, are read commands, the order of execution does not matter as no data hazard exists, i.e., there are no read-read data hazards. Thus, if the command queue includes write commands, command dependencies must be recognized to avoid data hazards.

In FIG. 1A, consider logical block addresses A, B, and C each originally containing the data pattern "z". A write(A, B,x) command and a write (B,C,y) command are presented for execution. The write (A,B,x) command fills logical block addresses A and B with the data pattern "x", while the write (B,C,y) command fills the logical block addresses B and C with the data pattern "y." If the write (A,B,x) command is first executed, logical block addresses A, B, and C ultimately will have data patterns "x", "y", and "y" respectively. If, however, the write (B,C,y) command is first executed, the logical block addresses A, B, and C ultimately will contain data patterns "x", "x", and "y", respectively. This is an example of a write-write hazard.

In FIG. 1B next consider a read (A,B) command referencing logical block addresses A and B and a write (B,C,y) command referencing addresses B and C. Regardless of the order of execution, logical address B and C will ultimately contain the data pattern "y" and logical address A will contain its original data pattern "z." The data hazard arises with respect to data submitted to the requesting host. More particularly, when the read (A,B) command executes first, the host receives the original content of logical addresses A and B, i.e., the data patterns "z" and "z." If, however, the write (B,C,y) command is first executed, the host receives in response to the read (A,B) command the original data value content of logical address A, i.e. the data pattern "z", but erroneously receives the data pattern "y" for the logical address B. This is an example of a read-write hazard.

Accordingly, to avoid data hazards, I/O command queue reordering must account for such dependencies in any order of I/O command execution which differs from the order of presentation. Generally, each I/O command is executed in the order presented, and reordered only under conditions taking into account the I/O command's dependency relative to I/O commands with overlapping logical block addresses.

Any reordered sequence of I/O commands is semantically correct only if its execution results in the same data being written to disk, or the same data being transferred to the host, which would have been written or transferred had the I/O commands been executed in the order of original presentation to the disk drive.

The task of comparing logical block address ranges and managing dependencies can incorporate substantial computational overhead into the disk drive control apparatus. Because interaction with the host and supervision over data transfers between the host and the selected disk data storage location(s) is interleaved with the I/O command queue reordering process, any reordering process must be executed in a timely fashion for appropriate interleaving amongst other high priority disk control activities. Generally, simple methods of command queue reordering require a high level of computational overhead when performing address overlap-checks to identify data hazards. To complete all latency computations and overlay checks in time, the number of candidates considered for command queue promotion may have to be limited, thereby restricting the search for least-latency to a subset of the present I/O command queue.

Excess computational overhead arises not so much with latency computation, but when a command selected for its desirable characteristic of least-latency is found to have a dependency on a more forward command in the queue and cannot be promoted to be next executed. A new candidate for promotion must be selected. This requires repeat execution of both the selection and the overlap checking procedures to find the next best least-latency command. As used herein, the term "n" represents the number of I/O commands in the command queue, and the term "$\alpha$" represents the number of dependencies in the queue. The number of repetitions required to obtain a command eligible for promotion within the command queue is $o(\alpha)$ on the average. For each repetition, the time required for scanning down the queue to find a least latency command is $o(n)$, and the time required for a series of address overlap checks between the selected command and the commands in front of it in the queue is $o(n)$ on the average. Therefore the complexity of the whole selection process is $o(n)*o(\alpha)=o(n*\alpha)$ to find a least-latency command eligible for promotion.

This computational overhead is undesirable for the potential of the final selection step requiring too much processing time. Because queue reordering must be interleaved with disk and host transfer activity, a step in the queue reordering process having computational overhead of $o(n*\alpha)$ can cause undesirable delay in handling the more time-critical, higher priority host interaction activities.

One particularly burdensome aspect of the above noted simple method of incorporating a dependency check into the reordering algorithm is the number of comparisons required in address overlap checking. For consecutive passes of reordering, every time a command is proposed for promotion, a series of address overlap checks must be executed for that command, even if it was earlier proposed for promotion, because previous dependencies for that command may have been removed as more forward commands exit the queue.

Accordingly, a command queue reordering algorithm must actively maintain dependency information in command execution sequence. Such algorithms are desirably not computationally burdensome to the point that more vital or higher priority activities are degraded, i.e., interaction with a host slowed. The subject matter of the present invention provides such an I/O command queue reordering algorithm which takes into account command dependencies, but does not impose an unacceptable computational overhead otherwise interfering with host-disk interaction: i.e., interference with accepting new commands and writing data, and delivering the results of read operations to the host.

SUMMARY OF THE INVENTION

A general object of the present invention is to precompute and maintain the dependency information of I/O commands awaiting execution in a command queue such that the number of address overlap-checks is minimized.

A related object of the present invention is to organize the information so as to make least-latency command selection simple and efficient.

Another object of the present invention is to provide an alternative representation of the command queue which is constructed in the form of a dependency graph. A flow analysis is performed on the graph to detect dependencies during the least-latency command selection process.

As one aspect of the present invention, a method is provided for I/O command queue reordering for a memory storage device accessed by logical block addresses. The method comprises the steps of:

maintaining a plurality of command records, each command record representing a member of the I/O command queue, each record including a dependency flag field, a queue pointer field, and a dependency list, the dependency list representing rearward members of the command queue having dependency on the command associated with the record containing the dependency list, the queue pointer maintaining sequential relation among members of the command queue, the dependency flag indicating a dependency of the associated command relative to a more forward command in the command queue;

building dependency lists of each record for each member of the command queue as new records are appended to the command queue;

deleting records from the command queue upon completion of the corresponding command; and reordering the command queue by first clearing all dependency flags of records therein, traversing the queue and for each record encountered having members in its dependency list setting the dependency flag for each member in the dependency list, and restricting selection of records promoted for next execution to records having dependency flags clear.

As a related aspect of the present invention, the memory storage device selectively provides access to physical data storage locations in accordance with determined latencies, and the step of restricting is accomplished subsequent to a step of calculating a latency value for each command in the command queue and comprises the further step of converting each logical block address into a physical data storage location address.

As a further related aspect of the present invention, the memory storage device comprises a multi-surface rotating disk drive having physical cylinder, head and sector address locations for user data blocks, and the step of converting each logical block address into a physical data storage location address comprises the step of converting each logical block address into a cylinder, head and sector address.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS

In the Drawings:

FIGS. 1A and 1B illustrate two forms of data hazard encountered when reordering a disk drive command queue.

FIG. 2 is a command queue illustrating a sequence of I/O command ordering.

FIG. 3 is a record structure employed under the present invention to implement command queue sequencing and a graph structure supporting a representation of command dependencies within the command queue.

FIG. 4 is a graph structure representing command dependencies in the command queue of FIG. 2.

FIGS. 5A, 5B, 5C, 5D, 5E and 5F illustrate construction of the queue of FIG. 2 for each new record added thereto.

FIGS. 6A, 6B, 6C, 6D, 6E, and 6F respectively correspond to FIGS. 5A–5F, and illustrate the construction of the graph structure of FIG. 4 as each new record is added to the command queue of FIG. 2.

DETAILED DESCRIPTION OF A PREFERRED EMBODIMENT

Figure 1C:
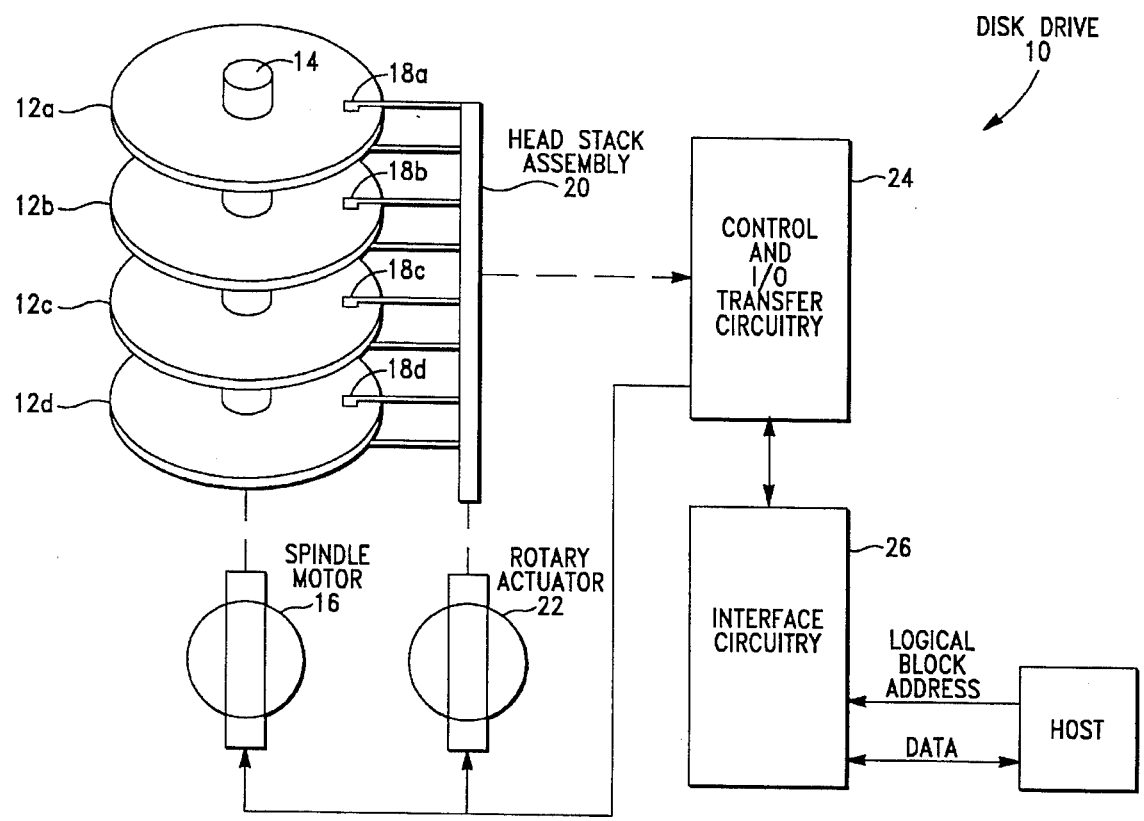
FIG. 1C is a simplified diagram of a disk drive capable of performing under the present invention.
Figure 1A:
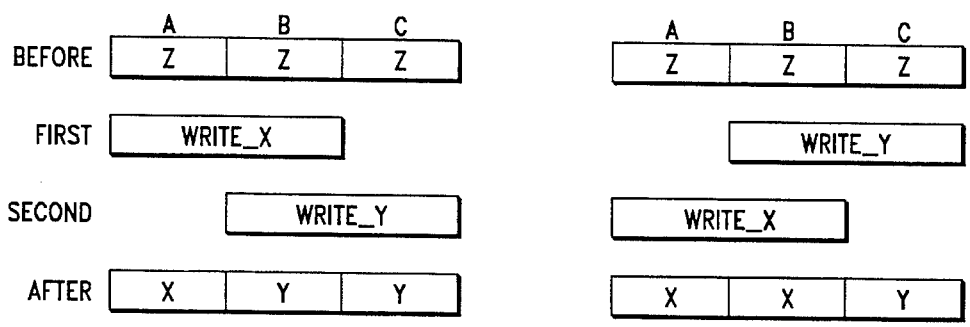

Referring now to FIG. 1C, a disk drive 10 includes e.g. a plurality of magnetic storage disks 12a–12d rigidly attached to a spindle 14. The disks 12 and spindle 14 are commonly rotated by a motor 16 at a predetermined angular velocity. A plurality of data transducer heads are provided with each one being associated with a respective data storage surface of the disks, with heads 18a, 18b, 18c, and 18d being respectively associated with upper storage surfaces of disks 12a, 12b, 12c and 12d, and with the heads and the lower storage surfaces of the disks 12a–d being hidden in the drawing) The heads are supported by, and commonly positioned by a head stack assembly 20, including e.g. a rotary voice coil actuator 22. The head stack assembly 20 is moved as a unit by the rotary actuator 22 so that the heads 18 are positioned in unison at concentric data track locations (called a "cylinder") within a range of positions between a radially innermost data storage cylinder near the spindle 14 and a radially outermost data storage cylinder near the peripheral edges of the storage disks 12. In this particular example, the heads 18 "fly" in close proximity to their respective data storage surfaces in accordance with Winchester technology. In this manner, any concentric data track location on a surfaces of one of the disks can be made to pass by a head associated with that surface. The rotational speed of the disks 12a–12d and the position of the head stack assembly 20 and rotary voice coil actuator 22 is controlled by a disk drive control circuit 24. Other portions of the control circuit 24 receive and interpret head position signals from e.g. embedded servo sectors defined on the data surfaces of the disks 12 via selected heads 18 of the head stack assembly 20. A disk drive interface circuit 26 is tightly coupled with the drive control and transfer circuit 24 and communicates with a host (not shown), for receiving I/O commands from the host, for providing drive status to the host, and for writing user data blocks to disk, or providing user data blocks from disk to the host, in response to each particular I/O command. Each concentric data track is divided into a series of arc segments, referred to as "sectors". These sectors are typically, although not necessarily, of fixed data block length.

A "logical block address" or "LBA" is applied by the host to the disk drive to address logical data block locations of the disk drive. Each LBA is mapped by the disk drive circuits to a specific cylinder, and head, and sector location within the disk drive. Since there is only one head associated with each disk data storage surface, selection of a head amounts to selecting a particular data storage surface. Thus, the host specifies disk data block locations through the LBA, and the disk drive converts such logical addresses to physical cylinder, head, and sector locations of the drive.

Detecting data hazards can be done by comparing of ranges of overlapping LBAs. Thus, data hazards can be detected at the higher level logical addressing, i.e., by comparing LBA values. Calculating latency of one command relative to another command, i.e., determining the delay between completing one command and beginning execution of the next, must be based upon consideration of the actual cylinder, head and sector parameters mapped by the drive control electronics from the LBA(s) supplied by the host via each I/O command. As relevant to the present invention, it will be understood that a latency computation and least-latency selection algorithm may be applied to a queue of I/O commands maintained by the disk drive 10. The present invention works in concert with I/O command reordering algorithms, such as those calculating command latency and selecting least-latency, but restricts command promotion under certain conditions in order to reduce significantly the computational overhead required in carrying out the command queue reordering process.

With reference to FIG. 2, an example command queue 200 is maintained by linked list including command records 202, individually 202a–202f, coupled by rearward directed queue pointers 204, individually 204a–204f. As may be appreciated, the queue pointer 204f is a nil pointer indicating the end of queue 200. Records 202 are associated in some fashion with data, e.g., to be written to the disk, but such association is not relevant to the invention herein of ordering such records in the command queue to dictate a sequence of operation. Queue 200, therefore, can represent an indefinite number of I/O commands, there being only six command records 202 illustrated in FIG. 2.

Each command record 202 includes a logical block address range field 206, individually 206a–206f, and a field holding its queue pointer 204. Also, a head pointer 208 and tail pointer 210 provide access to the front and rear, respectively, of queue 200. As may be appreciated, the head-of-queue command indicated by head pointer 208 is presently under execution, and is removed upon completion thereof. Thus, the head pointer 208 identifies a record 202 to be deleted from queue 200. The tail pointer 210 indicates a position for adding a new command record 202 to the queue 200.

To ensure absolutely avoidance of all data hazards, the command records 202 could be executed sequentially beginning at the head-of-queue record 202a and working rearward therefrom. Queue reordering is imposed, however, to increase overall disk throughput by minimizing latency between the head-of-queue command and a command next executed. Thus, command queue reordering requires a promotion of a selected command record 202 to occupy the location next rearward of the head-of-queue command to minimize overall latency in command execution. In accordance with the present invention, selecting a command record 202 for promotion is constrained to avoid data hazards resulting from overlapping logical block address ranges by executing a flow analysis of precalculated and maintained command dependencies in the queue 200. In the illustrated embodiment, this constraint is imposed after a latency value is computed for each command relative to the head-of-queue command, but before selecting a least-latent command.

The method of the present invention precomputes and maintains all command dependencies in a graph structure to reduce the number of address overlap-checks required. The graph structure dependency information makes the least-latency command selection process simple and efficient. The graph structure is an alternate representation of the command queue as a dependency graph to track the command dependencies. A flow analysis on the graph structure detects dependencies during the least-latency command selection step. The queue 200 remains as a representation of the sequential ordering of the command records 202.

A list of pointers for each command record 202 identifies all its dependents. The dependency lists for all commands are updated whenever a new command enters the queue 200. Starting from the head pointer 208 and scanning down the queue 200, each command record 202 is examined for logical block address overlap relative to the new command. For any command record 202 under examination having a range conflict with the new command record 202, a pointer is added to the dependency list for the command record 202 under examination, i.e., pointing to the new command record 202. The dependency pointer to the new command record 202 indicates that the new command is a dependent of the command under examination.

FIG. 3 illustrates a structure of records 202 supporting both entry sequenced, and dependency graph representations of a preferred embodiment of the present invention. In FIG. 3, each record 202 includes an $LBA_1$ field 302, an $LBA_2$ field 304, a D__List field 306, a D__Flag field 308 and a Q__Pointer field 310. As may be appreciated, fields 302 and 304 indicate a range of logical block addresses. D__List field 306 is a pointer to a list of dependencies, i.e., to a linked list of dependency pointers to other record structures 202. As described more fully hereafter, the D__Flag field 308 is a bistate field marking a record 202 found to be dependent with respect to a more forward positioned record 202. Q__Pointer field 310 points to the subsequent record 202 in the queue 200. Generally, the Q__Pointer field 310 implements the queue 200 and the D__List field 306 implements a graph structure representing command dependencies in accordance with a preferred embodiment of the present invention.

At any point in time, and excluding reference to Q__Pointer fields 310, the queue records 202 and the dependency pointers in the queue records 202 form a directed acyclic graph (DAG). The queue records 202 are the nodes of the graph, and the dependency pointers are the arcs of the graph. FIG. 4 shows a dependency graph 400 for the queue 200 as presented in FIG. 2. Any command node, i.e., record 202, pointed to by a dependency arc, i.e., dependency pointer, is dependent relative to some other command node. Any command node in graph 400 which is not the dependent of any other command node corresponds to a root according to graph terminology. Root nodes of the dependency graph 400, therefore, represent independent commands.

In FIG. 4, dependency graph 400 includes records 202, alternatively referred to individually as nodes 202a–202f. Arcs 402, individually 402a–402e, represent dependencies inherent in queue 200 given the specified LBA ranges for each record 202 and the sequence of records 202 in queue 200. More particularly, arc 402a from node 202a to node 202f represents a dependency of node 202f relative to node 202a, i.e., the I/O command of node 202f cannot be executed prior to that of node 202a if one or both of the commands is a write command. Additional arcs in graph 400 show similar dependencies as a function of LBA range overlap and relative sequence in queue 200. For example, arc 402b indicates dependency of node 202c relative to node 202a. Arc 402c requires execution of node 202b prior to node 202d. Arc 402d requires prior execution of node 202b relative to node 202f. Finally, arc 402e indicates node 202c must execute prior to node 202f. Of interest, nodes 202a, 202b, and 202e are not dependent on any other command, i.e., have no arc 402 directed thereto, and are therefore considered to be independent command nodes.

As may be appreciated, arcs extending from a given node, such as arcs 402a and 402b extending from the node 202a, are represented in the dependency list for a given command record 202, i.e., as indicated by the D__List field 306. As discussed more fully hereafter, the D__Flag field 308 distinguishes between such nodes as independent nodes 202a, 202b, and 202e having no dependency and the remaining nodes 202c, 202d, and 202f having dependency relative to another more forward node 202 from which an arc 402 emanates in the dependency graph 400.

Figure 5E:
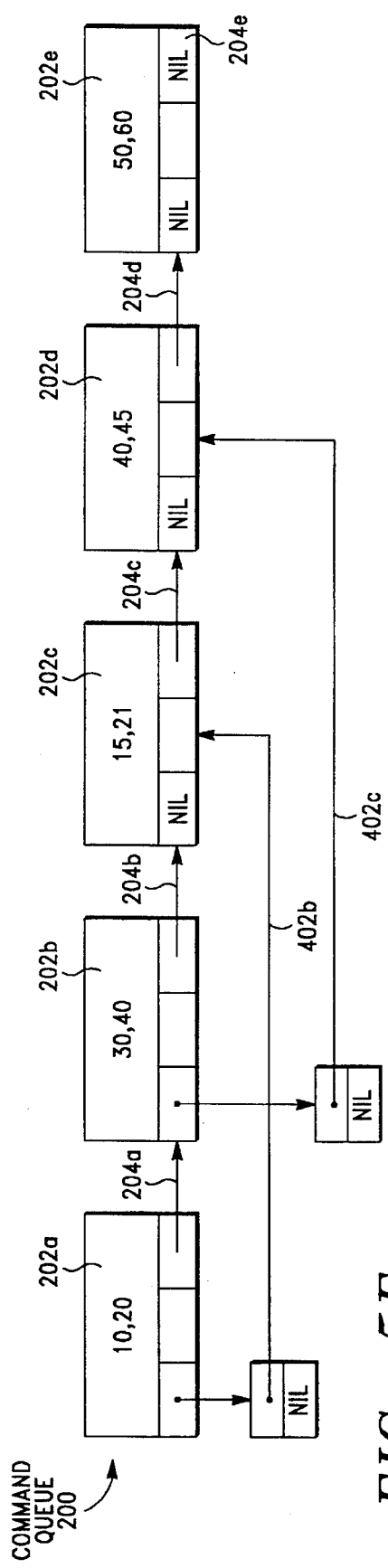
Figure 6E:
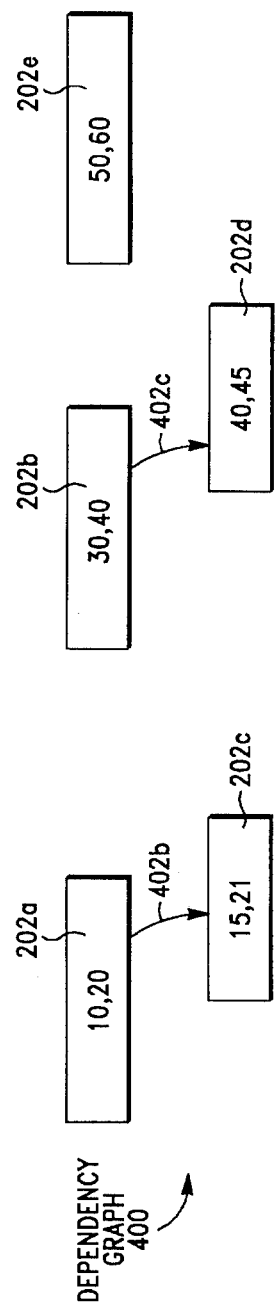
Figure 5F:
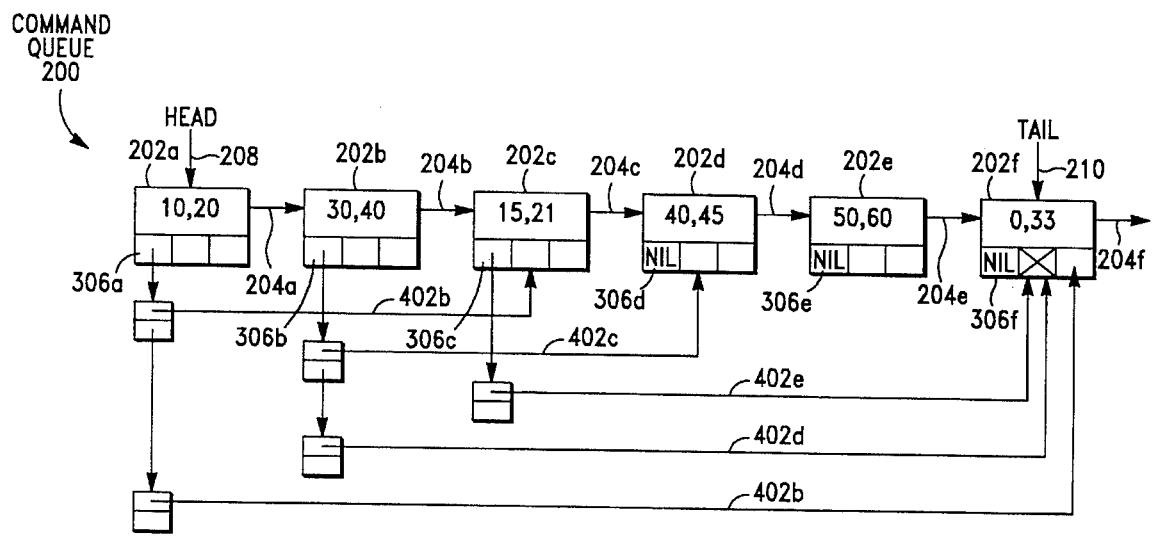
Figure 6F:
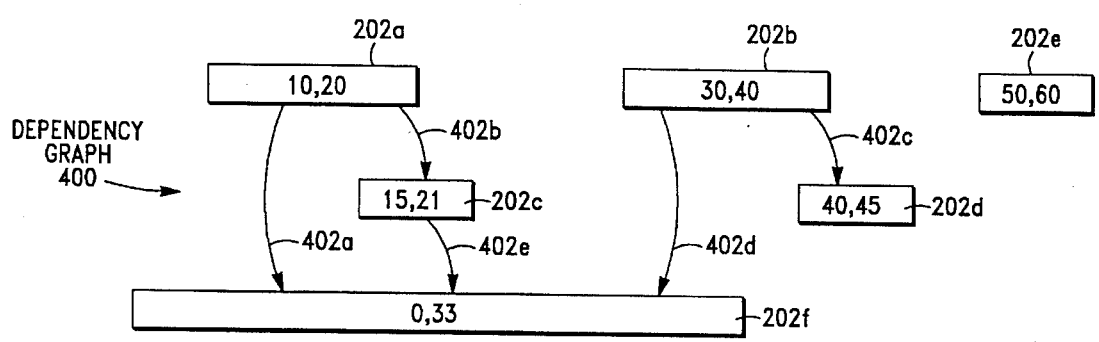

FIGS. 5A–5F progressively illustrate the queue 200 as it grows, beginning with the record 202a and adding successively each of the records 202b–202f. For illustration of data structure maintenance, it will be assumed that the queue 200 grows by addition of such records 202 without showing completion of the active I/O command. It will be understood, however, that the process of command execution is ongoing and queue 200 is a dynamic data structure always deleting just-executed command records 202 at the head pointer 208 and adding newly-received command records 202 at the tail pointer 210. FIGS. 5A–5B illustrate, in addition to the queue pointers 204 defining the queue 200, the list of dependency pointers, corresponding to arcs 402 of FIG. 4, for each record 202. (The D__Flag fields 308 in each record 202 indicate dependency relative to a more forward command record 202. The D__Flag field is set during a subsequent flow analysis process, not during the dependency calculation process illustrated in FIGS. 5A–5F). FIGS. 6A–6F illustrate corresponding steps of construction for the graph 400 as each new command record 202 is added to the queue 200.

Figure 8A:
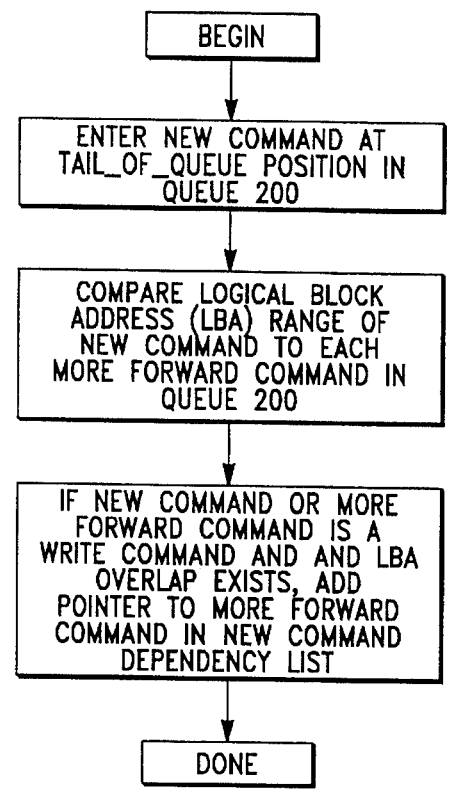
FIGS. 8A and 8B are flowcharts implementing building and maintaining the graph of FIG. 4 as commands enter and exit, respectively, the queue of FIG. 2.

FIG. 8A illustrates algorithmically the process of integrating new command records 202 into the queue 200 and graph 400. Separate processing (not shown) would actually attach the new command to the end of the queue 200. In FIG. 8A, the new command is compared to each more forward command in the queue 200. The procedure is merely a traversal of the queue 200 beginning at the command record 202 following the head-of-queue command record 202. If either the new command or the more forward command under comparison is a write command and a logical block address range overlap exists, then a member, i.e., pointer, is added to the dependency list of the command under comparison, the new pointer being directed at the new command record 202.

Figure 8B:
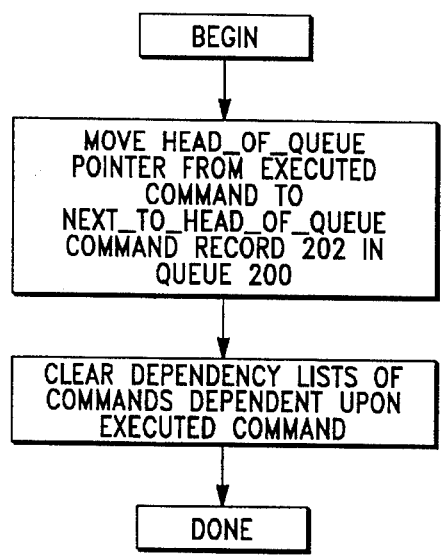

FIG. 8B illustrates removal of a command record 202 upon completion of the corresponding I/O command. Command record 202 removal merely requires moving the head pointer 208 to the next command record 202, i.e., the next executed position, and clearing the dependency list for the command record removed.

As may be appreciated, deleting a record 202 from the queue 200 at completion of its execution, also removes the corresponding node 202 from the graph 400, together with all the arcs 402 that originate from the deleted node. Accordingly, all dependencies on the head-of-queue command record 202 by other command records 202 are automatically removed by simply removing the head-of-queue record 202.

Thus, the dependency graph 400 is updated upon entry of every new command record 202 and the dependency information between all commands in the queue 200 is present at all times. In accordance with the present invention, the dependency graph 400 provides a basis for quickly identifying any independent commands, i.e., commands not dependent on more forward commands, as candidates for promotion to the position next executed in queue 200. Instead of selecting the least latency command and then checking its dependencies, however, the present invention contemplates a preliminary flow analysis of the dependency graph 400 to first isolate the set of independent commands, and then to select from the set of independent commands the command having a least-latency relative to the presently executing I/O command. To this end, the D_Flag field 308 of each record 202 signifies a dependency relative to some other record 202. The D_Flag field 308 is then used to identify independent commands. The D_Flag field 308 is updated for every pass of I/O command reordering.

Figure 7:
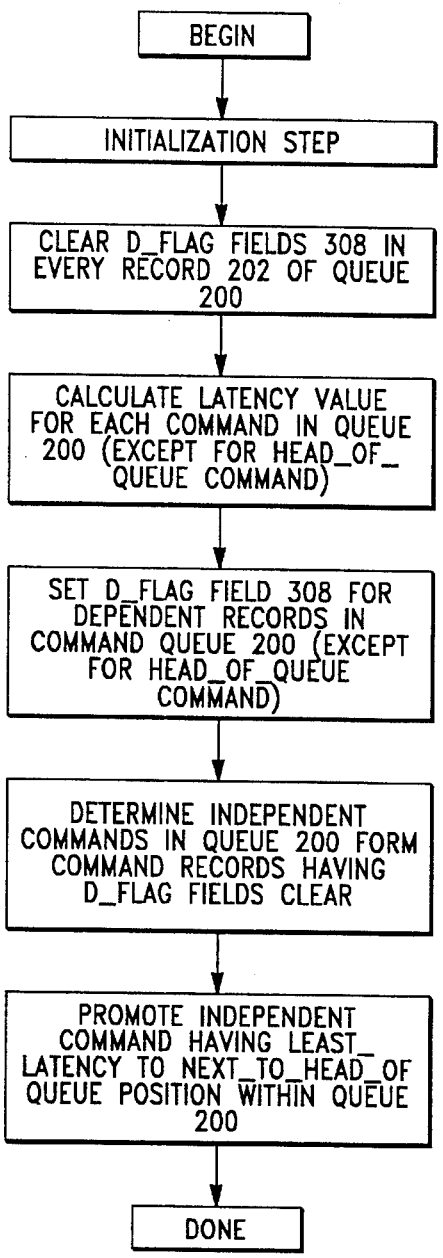
FIG. 7 is a flowchart implementing command queue reordering including computation of least latency, restriction in selection among promotion candidates as a function of command queue dependencies, and promotion of a least-latency command having no dependencies relative to more forward commands in the queue.

FIG. 7 illustrates a presently preferred embodiment of the queue 200 reordering algorithm. During the initialization step for each pass of the queue reordering algorithm, the D_Flag fields 308 are cleared in every record 202 of queue 200. This requires one pass through the queue 200. Next, a series of steps progressively calculate a latency value for each command in queue 200 relative to the head-of-queue command. This process is performed because each individual latency calculation step is relatively time consuming (requiring both seek length and rotational latency determinations) and it also accommodates entry of newly received I/O commands into the queue. This process altogether involves n steps passing through the queue 200.

The next step in queue reordering sets the D_Flag field 308 for dependent records 202 in the command queue 200. Thus, in one pass through the queue 200, each dependency list of each record 202 may be traversed seeking records having dependencies relative to the current record 202 and setting the D_Flag field 308 for any such more rearward dependent records. The head-of-queue command is ignored in this analysis as it cannot be preempted, and does not inflict any dependencies for any other commands any more, even if the logical block addresses overlap. Thus, for each command record 202 examined in scanning down queue 200, the members of its dependency list, i.e., following the D_List field 306, indicate which more rearward records 202 should have their D_Flag fields 308 set. Since a given command record 202 can depend on multiple command records 202, the D_Flag field 308 of any given record 202 may be set more than once. After a complete scan of the queue 200, all commands that still have their D_Flag fields clear are determined to be independent commands.

Status as an independent command is a precondition for selection as the least-latent command and promotion to the next command to be executed. Only this set of independent commands is examined by the step of least-latency selection. The final least-latency selection step, i.e., picking an awaiting I/O command having the smallest pre-calculated latency value, can occur while scanning down the queue 200, starting from the record 202 just behind the head-of-queue record 202. The independent commands of the set considered in this step are those encountered with a clear D_Flag field 308.

In the final step of command queue reordering, the member of the set of independent commands having the smallest latency value associated therewith is promoted to be the next command to be executed, i.e., moved in the queue 200 to the queue position just behind the head-of-queue command record.

```
COMMAND QUEUE REORDERING ALGORITHM
    initialize this pass of reordering;    /* initialization (1-step)*/
for (each command in queue) {
        clear DEPENDENT flag;
}
for (each command after head-of-queue) { /* latency calculation (n-steps)
*/      calculate latency with respect to head-of-queue;
}
for (each command after head-of-queue) { /* least-latency selection (1-
step) */ for (each dependency pointer in command) {
        set DEPENDENT flag oof command it points to;
    }
}
for (each command after head-of-queue) {
if (DEPENDENT flag not set) {
        remember command if least-latency;
    }
}
promote least-latency command;    /* promote least-latency */
ALGORITHM FOR BUILDING COMMAND DEPENDENCY GRAPH--
    for (each command before new command) { /* command entry */
        if (command and new command has LBA range overlap &&
            either one is a write command)    {
            add pointer to new command in command's dependency list;
        }
}
ALGORITHM FOR CLEARING COMMAND DEPENDENCY GRAPH
```

| |
|---|
| clear command's dependency list; /* command exit */ |

The above illustrated data structures and methods of analysis provide a significant reduction in computational overhead required in accounting for command dependencies in the context of command queue reordering. This reduction in computational overhead makes possible the timely interleaving of other more high priority activities, i.e., interaction with the host device, while still ensuring avoidance of data hazard.

Consider a dependency graph 400 with n nodes and $\alpha$ arcs 402. The steps involved in maintaining the dependency graph and doing the flow analysis have the following complexities. To form the dependency arc 402 for a new command takes o(n) time. To clear the dependency arc for an exiting command takes o(1) time. To clear the D__Flag fields 308 for all commands in the queue 200 takes o(n) time. To set the D__Flag fields 308 for dependents in the queue takes o(n+$\alpha$).

Doing a full dependency check between all commands in the queue takes $o(n^2)$ time. This is too much computational overhead for each pass of reordering. For an approach where dependency is checked after selecting the least-latency command, and repeating if dependencies occur, the complexity is o(n*$\alpha$). The flow analysis method under the present invention having complexity of o(n+$\alpha$) is a significant reduction in computation required for the dependency analysis. The dependency graph 400 also maintains full dependency information at all times, and flexibly supports the graph flow analysis.

Thus, an improved method of queue reordering has been shown and described. Under the method of the present invention, candidates for promotion must be qualified as independent commands as determined in the graph structure representing dependencies of commands relative to more forward commands. In the illustrated embodiment, a list of pointers in a given command record identify more rearward commands dependent therefrom. In this manner, deleting each record from the queue, i.e., upon completion of the corresponding I/O command, automatically clears all such dependencies from the graph structure. Computational overhead required for implementation of the queue management algorithm is sufficiently small to avoid interference with other high priority disk drive operations. While the present invention has been shown and described in connection with a particular form of latency calculation, it will be understood that a variety of latency calculation methods may be employed in implementation of a given form of the present invention.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A method of managing a command queue within a storage device defining a multiplicity of block addresses for storing user data blocks and receiving into the command queue a group of presently unexecuted input/output (I/O) commands for the device from a host system, the method comprising the steps:

maintaining a sequential ordering of said group of commands within the command queue;

maintaining command execution dependency relation information for each command of said group, each dependency relation indicating an overlap of block addresses between a given command and other commands within the group;

identifying a set of independent commands within the group as having no block address overlap relative to other commands within the group; and selecting one of said independent commands for promotion to a command execution position within the command queue, said selected independent command determined by the device to be a least-latent one of said independent commands relative to a head-of-queue command presently being executed within the storage device.

2. The method according to claim 1 wherein said dependency information is maintained as a graph structure within the storage device as including a node representing each said command and an arc between plural nodes representing a command execution dependency relation between plural commands of said group.

3. A method of managing a command queue within an addressable storage device receiving input/output (I/O) commands from a host for retrieving and writing user data blocks, the addressable storage device having multiple block addresses for storing blocks of user data, the method comprising the steps:

maintaining a sequential ordering of said commands received from the host within the command queue wherein each new command is appended to a rearmost position of said sequential ordering and a command under execution is maintained at a forward most position of said sequential ordering until said command under execution completes execution, a next executed position of said sequential ordering being immediately rearward of said forward most position and indicating a command to be next executed following completion of the command under execution;

maintaining an execution dependency relation record for each command in said sequential ordering within the command queue, each execution dependency relation record indicating an overlap of block addresses between a given command and a more forward command in said sequential ordering;

identifying from said execution dependency relation record a set of independent commands as those commands within the command queue having no execution dependency relative to a more forward command within the command queue; and selecting one of said independent commands for promotion to said next executed position, said selected independent command being a least-latent one of said independent commands relative to said command under execution.

4. The method according to claim 3 wherein said step of maintaining an execution dependency relation record includes for each new command received into the command queue the steps of scanning said sequential ordering from said rearmost position to said forward most position and comparing block addresses for said new command with block addresses for each of said commands in said sequential ordering, and entering a dependency relation into the execution dependency relation record for said new command when a block address overlap is determined to exist by the comparing step.

5. The method according to claim 3 wherein said step of maintaining an execution dependency relation record comprises the step of maintaining a graph structure wherein nodes of said graph correspond to commands in said command queue and arcs emanating from a first given node to a second given node indicate dependency of said second given node relative to said first given node.

6. The method according to claim 5 wherein said graph structure is implemented by each command in said command queue being associated with a linked list of pointers, a pointer in said linked list of pointers indicating a more rearward command in the queue having an execution dependency relative to the command associated said pointer.

7. The method according to claim 3 wherein said method further comprises a step of calculating a latency value for each command in said sequential ordering relative to the command under execution and prior to said step of identifying a set of independent commands, said step of selecting one of said independent commands being comprised of a step of selecting an independent command having a smallest calculated latency relative to the command under execution.

8. The method according to claim 3 wherein said method further comprises the step of removing the command under execution at completion of execution thereof by moving a head of queue pointer to said next executed position and removing any execution dependency relation between the command under execution in a record of another command awaiting execution in the command queue.

9. A method for reordering presently unexecuted user data block access commands in relation to detected execution dependencies therebetween in a command queue within a data storage device providing a multiplicity of logical block address (LBA) storage locations for storing blocks of user data, the method comprising during execution of a head-of-queue command the steps of:

maintaining a plurality of user data block access command records, a particular record representing a particular command of the user data block access command queue, and the particular record including an LBA range, a dependency flag field, a queue pointer field, and a dependency list, the dependency list representing rearward members of the command queue having execution dependency upon the particular command, the queue pointer field maintaining position of the particular command within the command queue, the dependency flag indicating an execution dependency of the particular command upon a more forward command in the command queue, and reordering the command queue by:
first clearing all dependency flags of records of the commands therein,
traversing the plurality of command records, and calculating execution latency values for the commands therein in relation to the head-of-queue command,
setting the dependency flags of the records of rearward members having execution dependencies upon each record traversed,
restricting command reordering to a next-to-head-of-queue position to those commands having records with command dependency flags clear, and
promoting one of those command determined to have a least execution latency value to the next-to-head-of-queue position within the command queue.

10. A method for reordering presently unexecuted user data block access commands in relation to detected execution dependencies therebetween in a command queue within a data storage device providing a multiplicity of logical block address (LBA) storage locations for storing blocks of user data, the method comprising the steps of:

maintaining a plurality of user data block access command records, a particular record representing a particular command of the user data block access command queue, and the particular record including an LBA range, a dependency flag field, a queue pointer field, and a dependency list, the dependency list representing rearward members of the command queue having execution dependency upon the particular command, the queue pointer field maintaining position of the particular command within the command queue, the dependency flag indicating an execution dependency of the particular command upon a more forward command in the command queue, and reordering the command queue by:
first clearing all dependency flags of records of the commands therein,
traversing the plurality of command records, and calculating execution latency values for the commands therein in relation to the head-of-queue command,
setting the dependency flags of the records of rearward members having execution dependencies upon each record traversed,
restricting command reordering to a next-to-head-of-queue position to those commands having records with command dependency flags clear, and
promoting one of those command determined to have a least execution latency value to the next-to-head-of-queue position within the command queue building dependency lists of each record for each member of said command queue as new records are appended to said plurality of user data block access command records; and deleting a record representing the top-of-queue command from said plurality of user data block access command records upon completion of execution of the top-of-queue command and thereby automatically removing dependency upon the executed command from the dependency lists of all other records remaining in the plurality of user data block access command records.

11. The method set forth in claim 10 wherein the step of building dependency lists of each record for each member of said command queue as new records are appended to said plurality comprises the step of determining execution dependencies for each new record based upon LBA range thereof in relation to LBA ranges of other records within the plurality.

\* \* \* \* \*